United States Patent [19] [11] 4,282,485
Pauwels et al. [45] Aug. 4, 1981

[54] LINEAR VARIABLE PHASE TRANSFORMER WITH CONSTANT MAGNITUDE OUTPUT

[75] Inventors: Michael A. Pauwels, Kalamazoo; Dan O. Bauer, Portage, both of Mich.

[73] Assignee: Pneumo Corporation, Boston, Mass.

[21] Appl. No.: 907,932

[22] Filed: May 22, 1978

[51] Int. Cl.³ .................. G01R 33/00; G01B 7/00
[52] U.S. Cl. .................. 324/208; 340/870.32; 318/653; 323/347; 336/45
[58] Field of Search .......... 324/207, 208; 340/195, 340/196, 199; 323/51, 90, 113; 336/45, 130, 136; 318/652, 653, 659, 660, 661

[56] References Cited

U.S. PATENT DOCUMENTS

| 2,769,969 | 11/1956 | Comstock | 340/196 |
|---|---|---|---|
| 2,911,632 | 11/1959 | Levine et al. | 340/195 |
| 2,988,697 | 6/1961 | Hirsch | 324/86 |
| 3,138,772 | 6/1964 | Persons, Jr. | 336/136 |
| 3,281,655 | 10/1966 | Blasingame | 323/51 |
| 3,546,570 | 12/1970 | Bullock | 318/661 |
| 3,555,542 | 1/1971 | Guiot | 318/661 |
| 3,671,876 | 6/1972 | Oshiro | 324/830 |
| 4,134,065 | 1/1979 | Bauer et al. | 324/208 |

FOREIGN PATENT DOCUMENTS

| 963715 | 7/1964 | United Kingdom | 336/136 |
|---|---|---|---|
| 1189981 | 4/1970 | United Kingdom | 324/208 |
| 1259787 | 1/1972 | United Kingdom . | |
| 982183 | 2/1975 | United Kingdom . | |
| 1406217 | 9/1975 | United Kingdom . | |

OTHER PUBLICATIONS

E. Hughes, "Electrical Technology", 4 Ed., 1969 published by Longmans, Green & Co., Ltd., pp. 457–459.

Primary Examiner—Gerard R. Strecker
Assistant Examiner—Walter E. Snow
Attorney, Agent, or Firm—Maky, Renner, Otto & Boisselle

[57] ABSTRACT

A linear variable phase transformer position to phase transducer produces a linear phase change in an output signal with respect to displacement. Moreover, the magnitude of such output signal remains relatively constant while such displacement occurs. The transducer includes two primaries which are specially wound according to sine and cosine functions and are excited out of phase, a secondary, and a core that combines the primary signals and induces the output signal in the secondary according to the core position relative to the primaries.

19 Claims, 3 Drawing Figures

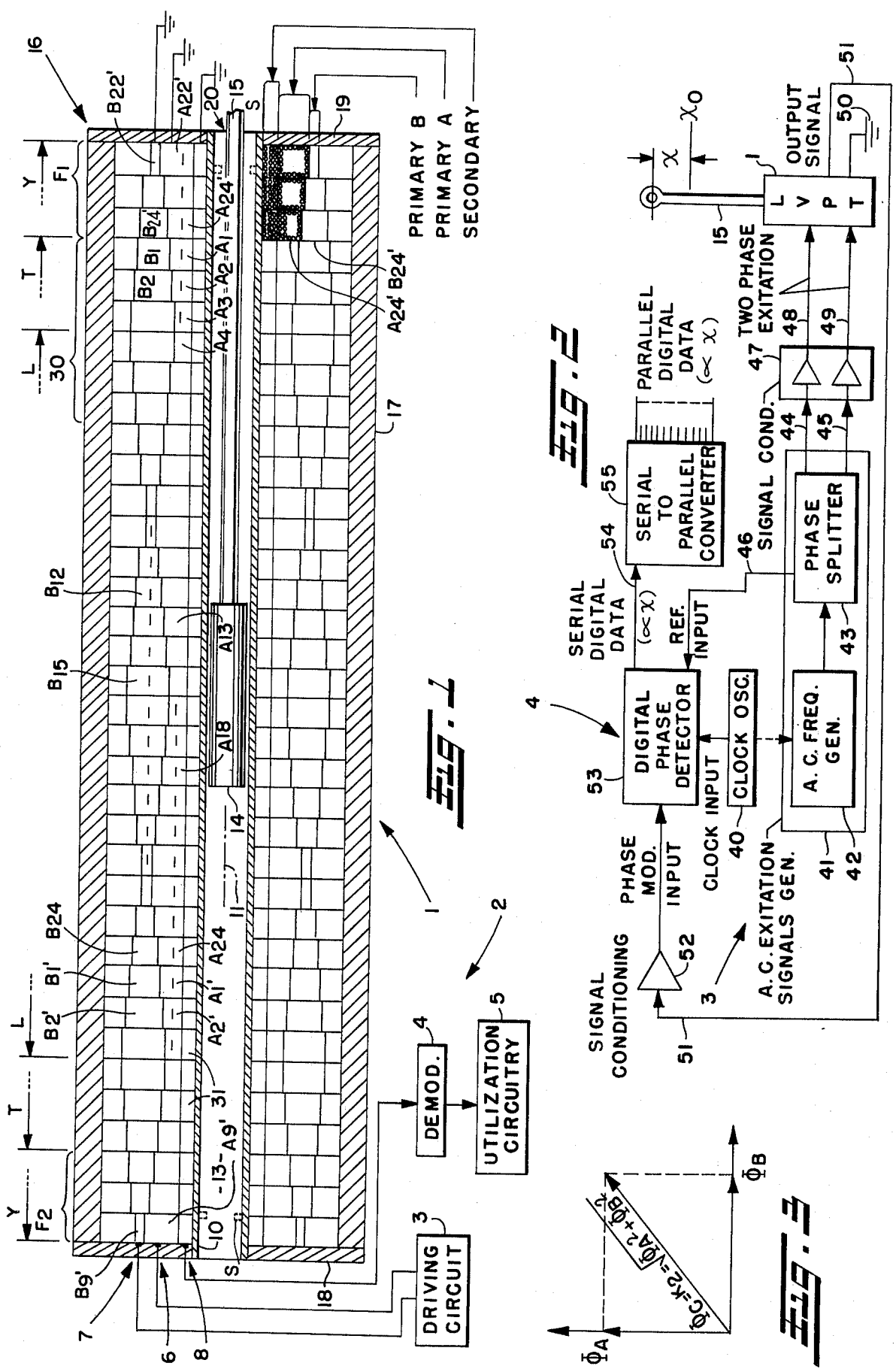

LINEAR VARIABLE PHASE TRANSFORMER WITH CONSTANT MAGNITUDE OUTPUT

BACKGROUND OF THE INVENTION

The present invention relates generally to displacement detecting transducers and, more particularly, to such a transducer that maintains a substantially constant magnitude output signal which varies in phase substantially linearly with respect to displacement.

CROSS REFERENCE TO RELATED APPLICATIONS

The following U.S. patent applications are copending with and assigned to the same assignee as the present application and the disclosures thereof are hereby incorporated by reference:

Ser. No. 758,654, filed Jan. 12, 1977, for "Linear Variable Phase Transformer", now U.S. Pat. No. 4,134,065 issued Jan. 9, 1979.

Ser. No. 784,335, filed Apr. 4, 1977, for "Pulse Width Modulator Digital Servo System", now U.S. Pat. No. 4,138,632 issued Feb. 6, 1979.

Ser. No. 847,938, filed Nov. 2, 1977, for "360 Degree Linear Variable Phase Transformer".

The prior linear variable phase transformers (LVPT's) disclosed in those applications convert position information to a phase quantity or time-based relationionship, which may be readily demodulated to provide a system output signal, for example, in a digital format. Plural linearly disposed non-overlapping primary windings of such LVPT's are energized or excited by respective AC excitation signals of the same frequency but ordinarily phase separated by other than 0° or 180° to produce in a relatively movable core axially oriented magnetic fluxes similarly out of phase. The fluxes are vectorially summed or combined in the core and the combined flux vector or output flux, which has a phase related to the positional relationship of the core and primaries, induces in a secondary an electrical output signal which has a corresponding phase. Accordingly, the phase of the output signal is directly related to the phase of the flux in the core, and it is the relative mix of primary excitations in the core that phase modulates an output signal to indicate the core position.

However, the magnitude of the output voltage was not controlled and in fact varied up to about 30% over the measurable stroke length. In some circumstances, though, it is desirable to hold such output voltage relatively constant, for example, to simplify the output circuit so it does not have to be insensitive to level. Then, an output signal reduction may be readily used for fault detection.

In such applications, circuitry is disclosed for energizing or exciting the respective LVPT primaries by phase separated and generally constant current AC excitation signals. A demodulator circuit, such as a zero crossing detector, detects the phase difference between the phase modulated output signal and a reference signal and whether the output signal leads or lags the reference signal, thereby to provide system output information indicative of the position of the core relative to the primaries, for example, with respect to a known null position. The system output information may be displayed or used for other control or like purposes.

To linearize the change in phase of the output signal with respect to core position (hereinafter referred to as linearity) the primaries of the prior LVPT's are wound in accordance with the solution of a particular arc tangent function and/or many primaries with respective excitations are used. Also, in the third application there are disclosed antifringing primaries which reduce fringing effects as the core moves to extremities of the transducer, thereby further increasing the linearity thereof.

RELATED PRIOR ART

One type of transducer that produces an output signal which varies in amplitude with respect to position is a linear variable differential transformer (LVDT). Although the input and output signals of LVDT's sometimes are described as phase related, the term "phase" there means polarity of an alternating current wave form. Other position transducers include moving coils wound on magnetically permeable material, such as resolver and synchro devices, or printed coils on magnetically permeable materials such as Inductosyne devices, but these require moving contacts or wires. A Selsyn device disclosed in U.S. Pat. No. 2,988,697 indicates the position of a movable core by combining radial flux vectors such that the geometric orientation of the flux vectors provides output information. In another position transducer disclosed in U.S. Pat. No. 2,911,632 the amplitude of the voltage induced in a secondary winding provides an indication of the position of a movable core.

SUMMARY OF THE INVENTION

"Primary winding" and "secondary winding" are referred to below as "primary" and "secondary", respectively. "Position" may be used to specify the positional relationship of the LVPT core and the primaries or to denote the relative displacement of the core, for example, from a null position, "displacement", accordingly, indicating the amount of position change. "Phase" means the actual phase of an AC electrical signal or magnetic flux signal or the separation relationship thereof to the phase of a reference such signal as opposed to a polarity relationship. "Phase quantity" means the phase difference between the LVPT phase modulated output signal or a square wave logic signal wave form in phase therewith, for example, and a reference signal; such phase quantity ordinarily will be distinguished with a polarity of its own to indicate whether the phase of the output signal is leading or lagging the reference signal. "Excitation phase" or "excitation signal" means an AC electrical signal of a particular phase for exciting a primary and may be used interchangeably. "Digital form" or "digital format" means any form of digital-type number of electronic representation thereof, as opposed to an analog representation thereof.

In the LVPT of the instant invention the output level, i.e. the magnitude of the voltage, for example, of the output signal, is maintained substantially constant while the phase of the output signal is modulated substantially linearly with respect to position. Plural primaries, in the preferred embodiment two, of the LVPT produce in response to respective alternating current excitations alternating magnetic fluxes that are combined in a core. The combined flux in the core induces an output AC electrical signal in a secondary with such signal having a substantially constant magnitude and a phase corresponding to that of the combined or output flux. Moreover, the plural, say two, primaries, which are energized by respective excitation signals, are so wound that the maximum variation of the output flux phase with respect to maximum displacement, say of the core relative to the primaries, may exceed the phase separation of the excitation signals. For example, as will be described further below, two excitation signals that are phase separated by 90° excite two respective primaries; yet the output signal phase actually is variable over a full 360° period.

The LVPT of the instant invention will be described below as including only two primaries that are respectively excited by excitation signals which are in quadrature, this combination providing the least complex embodiment of the invention. However, in view of the following disclosure, it will be understood by those skilled in the art that the invention may use more than two primaries or excitation signals that are phase separated by other than 90°.

Thus, the present LVPT includes two segmental and generally coaxial primaries, each primary segment being positioned along the LVPT axis for selective coupling with the core, depending upon the relative positions thereof, and each segment including a plurality of circumferential turns around the axis. The number of turns in each primary segment and the direction they are wound are determined in accordance with mathematical constraints, thereby to provide the substantially constant magnitude output signal and relatively large phase variation thereof in response to respective AC excitation signals and relative core position. In the preferred form the number of turns in the respective segments varies according to a sinusoidal function.

The LVPT requires only two primaries and, therefore, only two excitation signals, thus necessitating relatively simplified circuitry for energizing the same. However, since each primary may have many primary segments, thereby increasing the number of times the error function of the system theoretically passes through zero, there will be a high degree of linearity between the output signal phase and the core displacement.

Since the output information provided by the LVPT is an accurate time-based signal, such information can be used directly in analog form or readily demodulated, as in the above applications, to convenient digital format. Moreover, the LVPT of the present invention has the various features and advantages of the prior LVPT's, including, for example, relatively large maximum core stroke to total LVPT length ratio, linearity, accuracy, and efficiency of size, weight, strength, isolation, operative temperature range, etc.

With the foregoing in mind, it is a principal object of the present invention to provide a position to phase transducer, such as an LVPT, that is improved in the noted respects.

Another object is to obtain maximum phase variation of an output signal with respect to displacement, i.e. a change in position, using a minimum number of LVPT primaries, and, more particularly, to obtain a full 360° or more phase variation although the phase separation of the excitation signals is less than 360°.

An additional object is to provide an output signal phase variation that is capable of exceeding the total phase separation of the excitation signals delivered to a position to phase transducer.

A further object is to obtain a substantially constant magnitude output signal in a position to phase transducer.

Still another object is to increase the accuracy of a position to phase transducer.

Still an additional object is to minimize the circuitry requirements for energizing a position to phase transducer while maintaining a relatively high degree of accuracy of the output signal thereof.

These and other objects and advantages of the present invention will become more apparent as the following description proceeds.

To the accomplishment of the foregoing and related ends, the invention, then, comprises the features hereinafter fully described in the specification and particularly pointed out in the claims, the following description and the annexed drawing setting forth in detail a certain illustrative embodiment of the invention, this being indicative, however, of but one of the various ways in which the principles of the invention may be employed.

BRIEF DESCRIPTION OF THE DRAWINGS

In the annexed drawing:

FIG. 1 is a schematic cross sectional view of a sine cosine LVPT in accordance with the present invention;

FIG. 2 is a schematic circuit diagram illustrating the drive and demodulator circuitry for use in an LVPT system with the LVPT of FIG. 1; and FIG. 3 is a vector diagram representing quadrature related signals occurring in the LVPT.

DESCRIPTION OF THE PREFERRED EMBODIMENT

Referring now in detail to the drawing, a sine cosine linear variable phase transformer (LVPT) is generally indicated at 1 in FIG. 1 as part of an LVPT system 2 that also includes a drive circuit 3, a demodulator circuit 4, and utilization circuitry 5. The LVPT 1 has two primaries 6, 7 and a secondary 8, each of which is formed by a plurality of generally circumferential turns of respective conductors about a nonmagnetic bobbin 10. The bobbin 10 is located along the axis 11 of the LVPT 1, such axis being linear in the illustrated embodiment, it being understood, though, that the axis also may be nonlinear, such as circular, if desired. Within a hollow interior 13 of the bobbin a core 14 is positioned for movement relative to the primaries and secondary along the axis 11. A rod 15 coupled to the core extends beyond the LVPT case 16, which includes a cylindrical cover 17 and end plates 18, 19, through an opening 20 in the latter for mechanical connection to an external device, the position of which is to be detected by the LVPT 1. The bobbin 10 and case 16 may provide physical, e.g. temperature, pressure, humidity, etc., isolation of the respective electromagnetic coils forming the primaries and secondary.

In operation of the LVPT 1, the primaries 6, 7 are excited by the drive circuit 3 with excitation signals that are in quadrature. The excited primaries produce in the core 14 respective independent magnetic fluxes $\phi_A$ (due to the A primary 6) and $\phi_B$ (due to the B primary 7). Those independent fluxes are combined in the core 14, and the combined or output flux $\phi_C$ in the core causes an AC output signal to be induced in the secondary 8.

The phase of the output signal in the secondary 8 will depend on the phase of the combined flux in the core 14 and will vary according to the relative displacement x of the core 14 relative to the primaries 6, 7. In the following description it will be assumed that the core 14 is attached by the rod 15 to an external device, not shown, for movement therewith while the remaining parts of the LVPT 1, including the coils forming the primaries and secondary, are relatively fixed in their location;

however, it will be appreciated that the core may be maintained fixed in the coils moved so long as relative displacement is effected between the core and the coils. The output signal phase provides an analog indication of the core displacement, and this phase information can be demodulated in the demodulator circuit 4 to provide digital or other output information that can be readily used in the utilization circuitry 5, e.g. for display, feedback control, or like purposes.

In the present invention it is intended that the phase angle $\phi_c$ of the flux in the core 14 varies linearly with respect to displacement x. Therefore, the derivative of that phase angle $\phi_c$ with respect to displacement x, i.e. the change in such phase angle with respect to displacement, should be maintained constant. Moreover, in the present invention it is intended that the magnitude of the output flux $\phi_C$ in the core 14 and, thus, of the AC output signal induced in the secondary 8 be maintained constant. The following analysis describes the discovery for effecting such constraints to produce the LVPT 1 of the present invention.

The graph of FIG. 3 illustrates the quadrature relationships of the fluxes $\phi_A$ and $\phi_B$ as vectors induced in the core 14 by the respective excited primaries 6, 7. Also illustrated is the combined output flux $\phi_C$ vector, formed by taking the square root of the sum of the squares of fluxes $\phi_A$ and $\phi_B$, as is well known due to their quadrature relationship. The constraints of the LVPT 1, then, are such that the magnitude of the output flux $\phi_C$ vector remain substantially constant and that the phase angles thereof vary substantially linearly with respect to relative core displacement.

The output flux $\phi_C$ induced in the core 14 equals the vector sum of the fluxes $\phi_A$ and $\phi_B$ independently induced by the A and B primaries 6, 7 with each independent flux being directly proportional to the current through the respective primary and the number of turns of that primary effectively cut by or electromagnetically coupled to or seen by the core 14. Assuming that each of the primaries 6, 7 is energized by respective AC excitation signals $I_A$ and $I_B$ of equal maximum amplitudes I and of phase separation $\theta$, where $\theta$ equals 90° here for the excitation signals to be in quadrature, the currents through the respective primaries as a function of time can be written, as is well known, as follows:

$$I_A = I \sin\left(wt + \frac{\theta}{2}\right) \tag{1}$$

$$I_B = I \sin\left(wt - \frac{\theta}{2}\right) \tag{2}$$

These equations can be reduced, as follows, assuming the mentioned quadrature relationship:

$$I_A = I \sin wt = I < 0° \tag{3}$$

$$I_B = I \cos wt = I < 90° \tag{4}$$

The latter part of equations 3 and 4 relates the two currents and their relative phase angles.

In the frequency domain mathematically the phase angle $\phi_c$ of the flux in the core 14 is, as follows:

$$\phi_c = \arctan \frac{\phi_A}{\phi_B} \tan \frac{\theta}{2} \tag{5}$$

where $\phi_A$ and $\phi_B$, respectively, are the independent fluxes induced in the core 14 and coupled to the secondary 8 for a given position x of the core due to the primaries 6, 7, and $\theta$ is the phase separation of the two fluxes or of the excitation signals. In the present case the excitation signals are in quadrature so the phase separation is 90° and the tangent term of equation 5 becomes unity.

The derivative of equation 5 with respect to displacement x is equated to a constant $K_1$, as follows:

$$\frac{d\phi_c}{dx} = \frac{d}{dx} \arctan \frac{\phi_A}{\phi_B} = K_1 \tag{6}$$

which defines the desired linearity constraint to assure a linear relationship between the phase angle $\phi_c$ and displacement x.

The fluxes $\phi_A$ and $\phi_B$ relate to the ampere-turns of the respective primaries coupled to the core, as defined in the following equations:

$$\phi_A = C I_A n_a, \tag{7}$$

$$\phi_B = C I_B n_b, \tag{8}$$

where C is a proportionality constant, $I_A$ is the absolute value of current I through primary 6 at a phase angle of 0° and $I_B$ similarly is the current I through the primary 7 at a relative phase angle 90°, and $n_a$ and $n_b$ are the respective number of turns of primaries 6, 7 coupled with the core 14 at position x relative to the primaries.

Substituting the equalities of equations 7 and 8 into the frequency domain, equation 5 for flux angle $\phi_c$, the following relationships can be derived:

$$\phi_c = \arctan \frac{C I_A n_A}{C I_B n_B} \tag{9a}$$

$$\phi_c = \arctan \frac{I\,0°\,n_A}{I\,90°\,n_B} \tag{9b}$$

$$\phi_c = \arctan \frac{n_A I}{n_B I} \tan 45° \tag{9c}$$

the latter tangent function, of course, compensating for the phase angle separation of the two excitation currents and cancelling out to unity in view of the quadrature relationship of the excitation currents. Thus, the phase angle $\phi_c$ can be expressed as an arc tangent function of the "coupled" turns $n_A$, $n_B$, as follows:

$$\phi_c = \arctan \frac{n_A}{n_B}. \tag{9d}$$

The above linearity constraint of equation 6 now can be equivalently restated, as follows:

$$\frac{d}{dx} \arctan \frac{n_A}{n_B} = K_1. \tag{10}$$

Since the independent fluxes induced in the core are in quadrature, they are combinable according to the Pythagorean theorem, whereby in the frequency domain the square of the absolute magnitude of the flux $\phi_A$ plus the square of the absolute magnitude of the flux $\phi_B$ equals the square of the flux $\phi_C$ in the core, as shown in FIG. 3. To maintain the flux in the core $\phi_C$, according to the invention, constant, say equal to a value $K_2$, the sum of the squares of the fluxes $\phi_A$ and $\phi_B$ also must be kept constant as follows:

$$\phi_A{}^2 + \phi_B{}^2 = K_2{}^2 = \phi_C{}^2 \quad (11)$$

Assuming continued analysis in the frequency domain and equal and constant magnitudes I of the currents $I_A$ and $I_B$, equation 11 can be rewritten in accordance with the equalities presented in equations 7 and 8, as follows:

$$C^2 I^2 n_A{}^2 + C^2 I^2 n_B{}^2 = K_2{}^2. \quad (12)$$

By transposing the constant terms of equation 12 that do not depend on displacement x, the following constant magnitude constraint relationship for the LVPT 1 can be established:

$$n_A{}^2 + n_B{}^2 = \frac{K_2{}^2}{C^2 I^2} = K_3{}^2, \quad (13)$$

where $K_3$ is a constant as long as the current amplitude I is maintained constant.

It has been discovered that one set of solutions that will satisfy both of equations 10 and 13 by relating the variables $n_A$ and $n_B$ to displacement x is, as follows:

$$n_A = N \sin \phi(x) \quad (14)$$

$$n_B = N \cos \phi(x), \quad (15)$$

where N is an arbitrary number and $\phi(x)$ is the expected phase angle of flux induced in the core by the respective primaries, individually, as a function of the core position x with respect to the primaries. This solution requires that the windings of primaries 6, 7 overlap along preferably the total length Y of the LVPT 1, a condition that was avoided in the prior LVPT's disclosed in the abovementioned applications for winding simplicity.

A practical application of the sine-cosine distribution of primaries defined in equations 14 and 15 is to quantize the distribution of winding turns along the total length Y of the LVPT 1. That total length Y, which is the length of the bobbin 10 over which the primaries 6, 7 and secondary 8 are distributed, equals the stroke length L over which the core 14 is movable, plus the core length C, plus the axial length of portions $F_1$ and $F_2$, described further below, of the primaries 6, 7 that are used as anti-fringing primaries in the manner described, for example, in the Ser. No. 847,938 application. The anti-fringing primaries compensate for fringing effect at the extremities of the LVPT 1 to avoid nonlinearities due to a loss of magnetic signal at such extremities. Therefore, the core 14 ordinarily is precluded, for example, by stops represented at S, as is shown also in the Ser. No. 847,938 application, from moving into direct effective alignment with the anti-fringing primary portions $F_1$ and $F_2$ so that the total effective length T of the LVPT 1 over which the core moves equals the stroke length L plus the core length C.

To quantize the distribution of winding turns along the length of the LVPT, for a stroke length L the LVPT can be divided into M equal sections. Then, if the phase is to change 360°, for example, although any other phase change can be selected, with a displacement change of L, then for a displacement change of L/M the phase of the output signal must change 360° divided by M. Moreover, the core length C may be chosen at any practical length. For example, the core length should be sufficiently long to assure an effective length that is greater than the axial length of any one primary section or longer for the combining of more fluxes in the core, and the core should be sufficiently short so that a relatively efficient core length to stroke length is obtained.

One exemplary model, the present base mode, of LVPT 1 illustrated in FIG. 1 that complies with the foregoing constraints and assumptions will now be described. However, it will be appreciated that this description is exemplary only and that other distributions of winding turns may be utilized in an LVPT in accordance with the present invention.

For the exemplary model, the total phase change of the output signal is chosen 360° for a total stroke length L change. The number of sections M into which each primary is divided for achieving that total phase change is selected at 24. Accordingly, for each incremental position of the core L/M, the phase change is about 15°. The core length is selected at one fourth the stroke length, L/4.

To apply such quantizing technique for determining the number of winding turns in each of the twenty-four sections or segments designated $A_1$ through $A_{24}$ of the A primary 6, starting at the right hand end of the total effective length T of the primary 6 the distribution or number of turns at each section of coil 6 can be expressed by the following series:

$$N_{A1}, N_{A2}, N_{A3}, N_{A4}, \ldots N_{AM-1}, N_{AM}$$

This series is serially repeated for the sections $A1'$ through $A6'$, which compensate for or accommodate the core length C, and sections $A7'$ through $A9'$ and $A22'$ through $A24'$, which are the anti-fringing primary portions $F_2$ and $F_1$, respectively.

It is, of course, known that the sine function (equation 14) is symmetrical about its maximum and about its zero crossing point, with a sign change occurring at the latter. Accordingly, it can be assumed that the sinusoidal distribution of windings formed by the various sections of primary 6 will have a symmetrical and repetitious distribution, for example, being symmetrical about the sections having the maximum number of winding turns in each and being symmetrical with a sign change about the sections having a minimum number of winding turns in each. Assuming such symmetry and also assuming that the net effect of the first six sections $A_1$ through $A_6$ of primary 6 on the output signal when the core 14 is aligned therewith produces a zero output signal, whereby sine 0° equals zero, the symmetry of the number of winding turns in the first six sections $A_1$ through $A_6$ of primary 6, as illustrated in FIG. 1, can be described by the following identities in which the subscripts A have been dropped for convenience: $N_6 = -N_1$; $N_5 = -N_2$; and $N_4 = -N_3$.

Similarly, symmetry about sections $A_9$ and $A_{10}$, a maximum number of turns $N_9$ and $N_{10}$ and no sign or polarity change at those sections can be assumed since they are one fourth the stroke length L from the sections $A_3$ and $A_4$. Also the net effect of sections $A_7$ through $A_{12}$ on the output signal when the core 14 is aligned therewith provides a maximum output signal with sine 90° being a maximum, one. Therefore, the relationship of the numbers of turns in sections $A_7$ through $A_{12}$ can be described, as follows:

$$N_7 = N_{12}; N_8 = N_{11}; \text{ and } N_9 = N_{10}.$$

Further, it is recognized that displacement along the LVPT 1 a distance L/2, one half the stroke length, from the first-mentioned sections $A_1$ through $A_6$ to the sections $A_{13}$ through $A_{18}$ should find symmetry about sections $A_{15}$ and $A_{16}$ and the same number of turns, but with reverse phase, sign or polarity, per section corresponding, respectively, with the first-mentioned sections. Thus, the following relationship is realized:

$$N_{13} = -N_1 = N_6 = -N_{18}$$

$$N_{14} = -N_2 = N_5 = -N_{17}$$

$$N_{15} = -N_3 = N_4 = -N_{16} \tag{17}$$

Similar equalities relating the number of turns in sections $A_{19}$ through $A_{24}$ to the other sections also can be defined, as follows:

$$N_7 = N_{12} = -N_{19} = -N_{24}$$

$$N_8 = N_{11} = -N_{20} = -N_{23}$$

$$N_9 = N_{10} = -N_{21} = -N_{22} \tag{18}$$

Thus, it will be seen that the entire winding pattern $n_A$ of equation 14 above for the sections of primary 6 will utilize only six different winding counts and respective opposite polarity connections for some of those to obtain the desired phase, polarity or sign. For example, the number of winding turns in primary section $A_4$ equals the number $N_4$, whereas the number of winding turns in the primary section $A_3$ equals $N_3$ turns. The numbers $N_4$ and $N_3$ are equal, and the minus sign designation in the matrix 17 indicates that the polarity of the electric connections to section $A_3$ is opposite from that of the connections to the section $A_4$, etc.

Moreover, assuming that the output signal induced in the seconary by the first group 30 of sections $A_1$ through $A_6$ of primary 6 when the core 14 is effectively aligned therewith is zero and that as the core 14 travels incrementally by primary section to the left in FIG. 1, for example to alignment with primary sections $A_2$ through $A_7$, then with sections $A_3$ through $A_8$, etc., the phase of the output signal due to the energized primary 6 changes by increments of 15°, etc., the equation 14 can be rewritten in conventional manner as six separate equations in six unknowns. For example, the second of such equations would be $N_2 + N_3 + \ldots + N_7 = N \sin 15°$. These equations also can be solved in conventional manner in conjunction with the equality matrices 17, 18 above to determine the number of winding turns in the respective sections of the primary 6. Although the solutions to such equations may include fractional numbers, these may be rounded off in usual fashion.

Thus, choosing the number N of equation 14 to be 667, such simultaneous equations can be solved and rounded off to yield:

$N_4 = 16$ turns
$N_5 = 47$ turns
$N_6 = 75$ turns
$N_7 = 98$ turns
$N_8 = 114$ turns
$N_9 = 122$ turns From these values, the matrices 17, 18 can be completed to indicate the desired number of turns in each section $A_1$ through $A_{24}$ of the A primary 6. The primed sections $A_1'$ through $A_9'$ and $A_{22}'$ through $A_{24}'$ have the same number of turns and electrical connections of the corresponding unprimed sections, and it will be appreciated that such array or pattern of sections could, if desired, continue repeating depending on the length of the LVPT 1 and the character of the desired output signal.

The winding distribution in the sections $B_1$ through $B_{24}$ and in the corresponding repetitive primed sections of the B primary 7 effectively are shifted or displaced 90°, that is the displacement L/4, from the distribution provided in the A primary 6 inasmuch as they follow the cosine function of equation 15. Thus, the number of turns and the polarity turns. Chart 1 presents the number of turns and the polarity of the electrical connections thereof for each of the sections of the A primary 6 and B primary 7 of FIG. 1. Preferably the respective sections of the primary 6 are connected in series with the negative signs at certain sections indicating a current flow in a relatively opposite direction from that flowing in the other sections. The sections of the primary 7 also are similarly connected in series with each other, and the primaries are excited in quadrature by the driving circuit 3.

CHART 1

NOTE: Turns per Section ("-" indicates reverse direction); each secondary section includes 50 turns.

| Primary A | Primary B |
|---|---|
| $A_{22}'$ $N_{22}$ −122 | $N_{22}'$ $N_4$ 16 |
| $A_{23}'$ $N_{23}$ −114 | $B_{23}'$ $N_5$ 47 |
| $A_{24}'$ $N_{24}$ −98 | $B_{24}'$ $N_6$ 75 |
| $A_1$ $N_1$ −75 | $B_1$ $N_7$ 98 |
| $A_2$ $N_2$ −47 | $B_2$ $N_8$ 114 |
| $A_3$ $N_3$ −16 | $B_3$ $N_9$ 122 |
| $A_4$ $N_4$ 16 | $B_4$ $N_{10}$ 122 |
| $A_5$ $N_5$ 47 | $B_5$ $N_{11}$ 114 |
| $A_6$ $N_6$ 75 | $B_6$ $N_{12}$ 98 |
| $A_7$ $N_7$ 98 | $B_7$ $N_{13}$ 75 |
| $A_8$ $N_8$ 114 | $B_8$ $N_{14}$ 47 |
| $A_9$ $N_9$ 122 | $B_9$ $N_{15}$ 16 |
| $A_{10}$ $N_{10}$ 122 | $B_{10}$ $N_{16}$ −16 |
| $A_{11}$ $N_{11}$ 114 | $B_{11}$ $N_{17}$ −47 |
| $A_{12}$ $N_{12}$ 98 | $B_{12}$ $N_{18}$ −75 |
| $A_{13}$ $N_{13}$ 75 | $B_{13}$ $N_{19}$ −98 |
| $A_{14}$ $N_{14}$ 47 | $B_{14}$ $N_{20}$ −114 |
| $A_{15}$ $N_{15}$ 16 | $B_{15}$ $N_{21}$ −122 |
| $A_{16}$ $N_{16}$ −16 | $B_{16}$ $N_{22}$ −122 |
| $A_{17}$ $N_{17}$ −47 | $B_{17}$ $N_{23}$ −114 |
| $A_{18}$ $N_{18}$ −75 | $B_{18}$ $N_{24}$ −98 |
| $A_{19}$ $N_{19}$ −98 | $B_{19}$ $N_1$ −75 |
| $A_{20}$ $N_{20}$ −114 | $B_{20}$ $N_2$ −47 |
| $A_{21}$ $N_{21}$ −122 | $B_{21}$ $N_3$ −16 |
| $A_{22}$ $N_{22}$ −122 | $B_{22}$ $N_4$ 16 |
| $A_{23}$ $N_{23}$ −114 | $B_{23}$ $N_5$ 47 |
| $A_{24}$ $N_{24}$ −98 | $B_{24}$ $N_6$ 75 |
| $A_1'$ $N_1$ −75 | $B_1'$ $N_7$ 98 |
| $A_2'$ $N_2$ −47 | $B_2'$ $N_8$ 114 |
| $A_3'$ $N_3$ −16 | $B_3'$ $N_9$ 122 |
| $A_4'$ $N_4$ 16 | $B_4'$ $N_{10}$ 122 |
| $A_5'$ $N_5$ 47 | $B_5'$ $N_{11}$ 114 |
| $A_6'$ $N_6$ 75 | $B_6'$ $N_{12}$ 98 |
| $A_7'$ $N_7$ 98 | $B_7'$ $N_{13}$ 75 |
| $A_8'$ $N_8$ 114 | $B_8'$ $N_{14}$ 47 |
| $A_9'$ $N_9$ 122 | $B_9'$ $N_{15}$ 16 |

Turning briefly to FIG. 2, a clock oscillator 40 provides a clock pulse input to an AC excitation signals generator 41. The generator 41 includes an AC frequency generator 42, which produces a square wave signal having a frequency depending on that of the clock pulse signal, and a phase splitter 43, which splits the square wave signal into two AC excitation signals on lines 44, 45, with such signals being in quadrature, i.e. out of phase by 90°. The phase splitter 43 also delivers a reference signal on line 46 to the demodulator 4, the reference signal having the same frequency as the signals on lines 44 and 45. A signal conditioner 47 converts the signals on lines 44 and 45 to conventional sinusoidal waves which are delivered via lines 48, 49 as the respective AC excitation signals to the primaries 6, 7 of the LVPT 1. The phase splitter 43 may include, for example, digital phase splitting circuitry, such as a plurality of flip-flops or the like. A grounding connection 50 is provided at the opposite ends of the primaries 6, 7.

During operation of the LVPT system 2 with the LVPT 1 so excited, the independent magnetic fluxes created in the core 14 by the respective sections of the respective primaries 6, 7 with which the core is aligned, i.e. turns of those sections are cut by the core, are combined in the core to produce an output flux. The phase of the output flux depends on the number of turns of the primaries cut by the core and the polarity of the connections of the primary sections cut by the core. Such output flux induces an AC output signal in the secondary 18 the phase of which will correspond directly to that of the output flux and, thus, will be indicative of the relative position of the core with respect to the primaries 6, 7. Since the secondary 18 is preferably uniformly wound the position of the core with respect to the secondary will not ordinarily affect the output signal.

During such operation of the LVPT 1, the distance between the relatively remote edges of primary sections $A_4$ and $A_3'$ or $B_4$ and $B_3'$ represents the stroke length L measurable by the LVPT. The additional axial length occupied by the primary sections $A_1$, $A_2$, $A_3$, $A_4'$, $A_5'$ and $A_6'$ and corresponding B primary sections with which the core 14 may align compensate for core length. Moreover, the still further axial length along the LVPT 1 occupied by the primary sections $A_{22}'$, $A_{23}'$, $A_{24}'$, $A_7'$, $A_8'$ and $A_9'$ and corresponding B primary sections, with which the core 14 ordinarily will not align as constrained by conventional means, not shown, provide anti-fringing function to avoid non-linearities in the output signal due to flux lost at the ends of the LVPT as the core approaches the extremities of its stroke. However, all of the A and B primary 6 and 7 sections are, respectively, connected together in series as described above to provide two distinct, complete continuous primaries.

The AC output signal from the secondary is delivered via line 51 to a signal conditioning circuit 52 in the demodulator. The signal conditioning circuit may be, for example, a squaring circuit and provides a phase modulated square wave signal to a digital phase detector 53. The detector 53 compares the phase of the square wave signal from the conditioning circuit 52 with that of the reference signal on line 46 and delivers on line 54 a number of pulses from the clock oscillator 40 representative of the phase difference. That serial digital data is converted by a serial to parallel converter 55 to parallel digital information, which may be used by external equipment, fed back for controlling the external device coupled to the LVPT, etc. Such circuitry is described in more detail in the above-mentioned '654 application. The phase difference or phase quantity and the digital information derived therefrom represent the position of the core with respect to the primaries.

The degree of phase nonlinearity of the output signal with respect to displacement is inversely related to the number of times the error function of the LVPT's system theoretical phase passes through zero. In the case of the above-described example, the phase of the output signal will have zero deviation from the theoretical phase at 24 discrete positions along the stroke length L, namely when the core is effectively fully aligned with any given six adjacent sections of the primaries, such as with sections $A_{13}$ through $A_{18}$ of primary 6 and $B_{13}$ through $B_{18}$ of primary 7, as illustrated in FIG. 1. The theoretical error envelope of the output phase, then, is about ±0.018%, with this error function being approximately a full order of magnitude improvement or reduction over prior LVPT's using approximately 2 to about 6 primaries and in some instances more than two excitation phases.

Furthermore, it has been discovered that the output voltage magnitude in the exemplary LVPT 1 described above will vary less than about ±1% with stroke as compared to up to about 30% deviation in the prior LVPT's such as the one disclosed in the '654 application. Moreover, as the quantizing number M described above is increased, the error function and the voltage deviation will be reduced further. The magnitude of the output signal, then, can be used to indicate the operative condition of the LVPT system 2, whereby a substantial change in such magnitude from the expected level indicates a fault.

The embodiments of the invention in which an exclusive property or privilege is claimed are defined as follows:

1. A displacement to phase transducer, comprising plural primary means for producing in response to alternating current excitation alternating magnetic fluxes, combining means for producing an output flux having a phase dependent on the relative positions of said combining means and said primary means, at least one of said combining means and primary means being movable relative to the other, and output means for producing an output AC electrical signal having a substantially constant magnitude and a phase corresponding to the phase of said output flux, and wherein each primary means includes plural axially displaced, coaxial segments and segments of one primary means overlap respective segments of a second primary means.

2. The transducer of claim 1, wherein each segment includes a plurality of electrically continuous winding turns circumscribing the axis of the transducer.

3. The transducer of claim 2, wherein all of the segments of said one primary means are electrically connected in series, and all of the segments of said second primary means are electrically connected in series.

4. The transducer of claim 3, further comprising power supply means for delivering alternating current excitation signals to said primary means to excite the same.

5. The transducer of claim 4, wherein said power supply means includes means for supplying a first AC excitation signal to said one primary means and a second AC excitation signal that is in quadrature relative to the first AC excitation signal to said second primary means.

6. The transducer of claim 2, wherein the number of winding turns in respective segments along such axis of the transducer varies according to a sinusoidal function of relative position along such axis.

7. The transducer of claim 6, wherein the number of winding turns in respective segments of said first primary means varies according to a sine function of relative position along such axis and the number of winding turns in respective segments of said second primary means varies according to a cosine function of relative position along such axis.

8. The transducer of claim 7, wherein in each respective primary means for those segments for which the respective sine or cosine function is of one polarity such segments are electrically connected in the respective primary means in a first polarity relation to produce respective electromagnetic fields that are in phase, and for those segments for which the respective sine or cosine function is of the opposite polarity such latter segments are electrically connected in the respective primary means in an opposite polarity relation to produce respective electromagnetic fields that are in phase with each other but of opposite phase polarity to such first-mentioned electromagnetic fields.

9. A displacement to phase transducer, comprising plural primary means for producing in response to alternating current excitation alternating magnetic fluxes, combining means for producing an output flux having a phase dependent on the relative positions of said combining means and said primary means, at least one of said combining means and primary means being movable relative to the other, and output means for producing an output AC electrical signal having a substantially constant magnitude and a phase corresponding to the phase of said output flux, wherein the transducer has an axis, each primary means includes a plurality of generally circumferential winding turns distributed along said axis according to a sinusoidal function of position along said axis, and said primary means are coaxial and overlapping.

10. The transducer of claim 9, wherein said output means comprises a secondary having a plurality of generally circumferential winding turns distributed along said axis in parallel coaxial and coextensive relation to said primary means.

11. The transducer of claim 9, wherein one of said primary means is distributed along said axis according to a sine function and another of said primary means is distributed along said axis according to a cosine function.

12. The transducer of claim 11, further comprising power supply means for effecting alternating current excitation of said primary means, respectively, in quadrature relation.

13. The transducer of claim 11, wherein said output means comprises a secondary having a plurality of generally circumferential winding turns uniformly distributed along said axis in parallel coaxial and coextensive relation to said primary means.

14. A displacement to phase transducer, comprising plural primary means for producing in response to alternating current excitation alternating magnetic fluxes, combining means for producing an output flux having a phase dependent on the relative positions of said combining means and said primary means, at least one of said combining means and primary means being movable relative to the other, and output means for producing an output AC electrical signal having a substantially constant magnitude and a phase corresponding to the phase of said output flux, further comprising an elongate axis, wherein said primary means each includes plural generally circumferential winding turns distributed along the axial length of said axis according to the sinusoidal function of position, a hollow interior passage being circumscribed by said primary means, and wherein said combining means comprises a magnetically permeable core relatively movable in said interior along said axis.

15. The transducer of claim 14, wherein said primary means comprises two primary means positioned in coextensive overlapping relation along said axis, and said output means comprises a secondary having a plurality of generally circumferential winding turns uniformly distributed along said axis in coextensive relation with said primary means.

16. The transducer of claim 15, wherein all of the winding turns of each primary winding means are, respectively, connected in electrical series, and in each of said primary means according to the respective sinusoidal function some of said winding turns are so connected to conduct current in one direction about said axis and some of said winding turns are connected to conduct current in an opposite direction about said axis.

17. The transducer of claim 16, further comprising power supply means for exciting said primary means, respectively, with equal magnitude AC excitation signals in quadrature relation.

18. The transducer of claim 15, wherein a portion of each primary means at each extremity of said axis comprises anti-fringing primary means for compensating for fringing effect, and means for restraining said core from moving into alignment with said anti-fringing primary means.

19. A displacement to phase transducer, comprising plural segmental and generally coaxial primary means for producing in response to alternating current excitation alternating magnetic fluxes, wherein segments of one primary means overlap respective segments of another primary means, combining means for producing an output flux having a phase dependent on the relative positions of said combining means and said primary means, at least one of said combining means and primary means being movable relative to the other, and output means for producing an output AC electrical signal having a phase corresponding to the phase of said output flux.

* * * * *